United States Patent [19]
Brown et al.

[11] Patent Number: 5,294,772
[45] Date of Patent: Mar. 15, 1994

[54] DEBRIS CONTROL SYSTEM

[75] Inventors: Michael E. Brown, Greensburgh, Pa.; William T. Grant, Pleasant Valley, N.Y.; Nabil A. Rizk; Nirmal S. Sandhu, both of Hopewell Junction, N.Y.; You-Wen Yau, Poughkeepsie, N.Y.

[73] Assignee: IBM Corporation, Armonk, N.Y.

[21] Appl. No.: 874,915

[22] Filed: Apr. 28, 1992

[51] Int. Cl.$^5$ .............................................. B23K 15/00
[52] U.S. Cl. ............................ 219/121.19; 219/121.33
[58] Field of Search .................... 219/121.19, 121.20, 219/121.21, 121.22, 121.33

[56] References Cited

U.S. PATENT DOCUMENTS

| | | | |
|---|---|---|---|
| 2,793,281 | 5/1957 | Steigerwald | 219/69 |
| 2,883,544 | 4/1959 | Robinson | 250/49.5 |
| 3,009,050 | 11/1961 | Steigerwald | 219/69 |
| 3,134,010 | 5/1964 | Bettermann, et al. | 219/69 |
| 3,351,731 | 11/1967 | Tanaka | 219/69 |
| 4,317,022 | 2/1982 | Kita et al. | 219/121.28 |
| 4,324,973 | 4/1982 | Kirwan et al. | 219/121.34 |
| 4,484,058 | 11/1984 | Howard et al. | 219/121.19 |
| 4,598,039 | 7/1986 | Fischer et al. | 219/121.19 X |
| 4,609,809 | 9/1986 | Yamaguchi et al. | 219/121.19 X |
| 4,716,270 | 12/1987 | Gnanamuthu et al. | 219/121.85 |
| 4,831,230 | 5/1989 | Lemelson | 219/121.12 |

*Primary Examiner*—C. L. Albritton
*Attorney, Agent, or Firm*—Romualdas Strimaitis; Jack Smith

[57] ABSTRACT

A debris control system is provided for an electron-beam drilling apparatus having a chamber encompassing a drilling area and a calibration area. The debris control system includes a calibration-area shielding assembly which shields a calibration area of such apparatus from drilling-generated debris and an isolation assembly which isolates drilling-generated debris within such drilling area.

14 Claims, 5 Drawing Sheets

DEBRIS CONTROL SYSTEM

FIELD OF THE INVENTION

This invention relates generally as indicated to a debris control system and, more particularly, to a debris control system which protects the sensitive components of an electron-beam or other similar type drilling apparatus.

BACKGROUND OF THE INVENTION

An electron-beam drilling apparatus is commonly used for drilling openings in a work-piece, such as a ceramic greensheet. Such greensheets are comprised of ceramic powder formed into sheets and held together with an organic binder contained in a solvent. A typical electron-beam drilling apparatus comprises a chamber which houses the components of the apparatus. A suitable low pressure vacuum is maintained in the chamber, such as by a vacuum pump.

A typical electron-beam drilling apparatus will additionally include an X-Y stage and a beam column for directing the electron beam onto the work piece. The X-Y stage is mounted within the chamber in such a manner that selective two-dimensional movement is possible thus the designation X-Y stage. The stage forms a pedestal including a beam-calibration area and a work-piece area. The beam-calibration area includes sensitive components, such as precision pin holes and faraday cups, which communicate with optical equipment including mirror and interferometer optics also contained within the chamber, which are used in the calibration of the electron beam and positioning of the table for drilling. The work-piece area includes support means designed to support a carrier for the work piece.

The beam column will usually constitute an opening in the chamber through which an electron-beam is projected and focused. In the initial stages of a drilling process, the X-Y stage will be moved into a calibration position whereat the pedestal's calibration area is aligned with the beam column thereby allowing calibration procedures to be performed. These procedures and optical equipment are conventional. The X-Y stage is then moved into a drilling position whereat the pedestal's work-piece area is aligned with the beam column thereby allowing drilling procedures to be performed on a work piece in a conventional manner. The X-Y stage will subsequently move into a variety of drilling positions, each of which, in the work-piece area, is aligned with the beam column to precisely drill an array of holes in the work piece.

Debris is generated during the drilling process which can damage the sensitive components of the apparatus, such as vacuum pumps, optical equipment and/or the bearings mounting the X-Y stages and thus drives for movement. In the past, an electron-beam drilling apparatus was designed to prevent debris from entering the column, however, no features were included to keep debris from entering the rest of the system. Consequently, the chamber needed to be frequently cleaned and the bearings and other components of the X-Y stage were often damaged by debris. Additionally, vacuum pumps had to be provided with special filtering devices to filter out ceramic particles to prevent damage thereto.

Thus there is a need for a debris control-system which contains drilling-generated debris within an easily cleanable area and away from sensitive components.

SUMMARY OF THE INVENTION

The present invention provides a debris control system which contains drilling-generated debris within an easily cleanable area and away from sensitive components. When incorporated into an electron-beam drilling apparatus, production of the apparatus is increased by reducing the duration and frequency of maintenance. Additionally, the system is made economically feasible by protecting expensive sensitive parts from damage. Still further, the chamber of the apparatus may be pumped and vented as required without blowing debris on sensitive components of the apparatus.

More particularly, the present invention provides a debris control system for an electron-beam drilling apparatus having a chamber encompassing a drilling area and a calibration area. The debris control system includes a calibration area shielding assembly which shields the calibration area of such apparatus from drilling generated debris and a drilling area isolation assembly which isolates drilling generated debris within such drilling and calibration areas.

The calibration area shielding assembly includes a support plate, a debris shutter or cover, and a reaction bar member. The support plate has a calibration opening which is vertically aligned with such calibration area. The debris shutter is coupled to the support plate in such a manner that it may be moved between an open position in which the calibration opening is uncovered and a closed position in which the calibration opening is covered and protected from debris. The debris shutter is biased into the closed position and the reaction bar causes the debris shutter to move to the open position when such calibration area is in a certain orientation with respect to the beam.

The drilling-area isolation assembly includes a flexible bellow curtain, an opening/closing member for opening and closing the bellows curtain and a filter. The bellow curtain defines an isolation chamber when in the closed position which encompasses the drilling area and the calibration area and the filter communicates with this isolation chamber to filter material exiting therefrom.

These and other features of the invention are fully described and particularly pointed out in the claims. The following descriptive annexed drawings set forth in detail one illustrative embodiment. However, this embodiment is indicative of but one of the various ways in which the principles of the invention may be employed.

DETAILED DESCRIPTION

Figure 1:
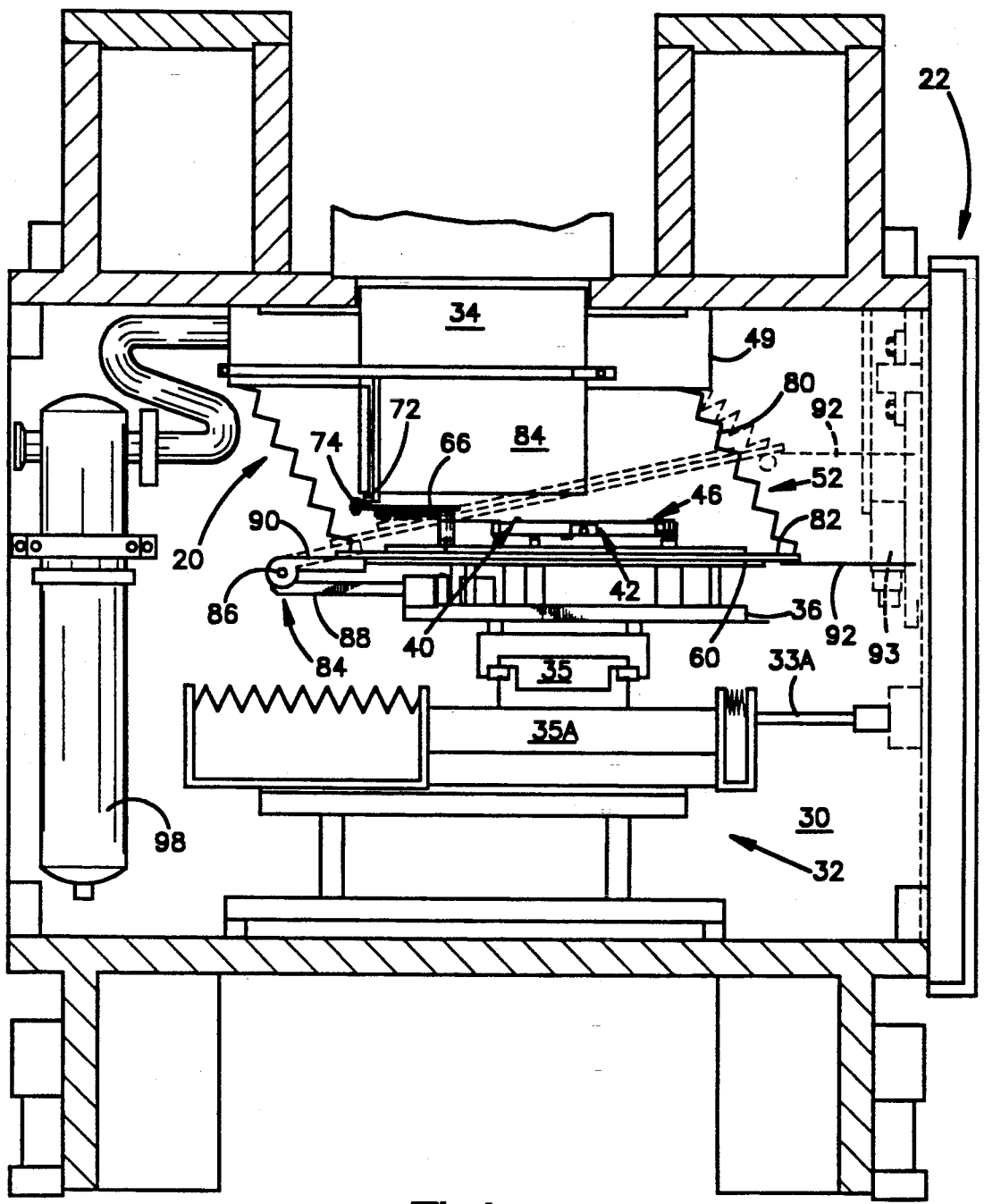
FIG. 1 is a longitudinal sectional view, somewhat schematic view, of an electron-beam drilling apparatus which incorporates a debris control system according to the present invention.
Figure 2:
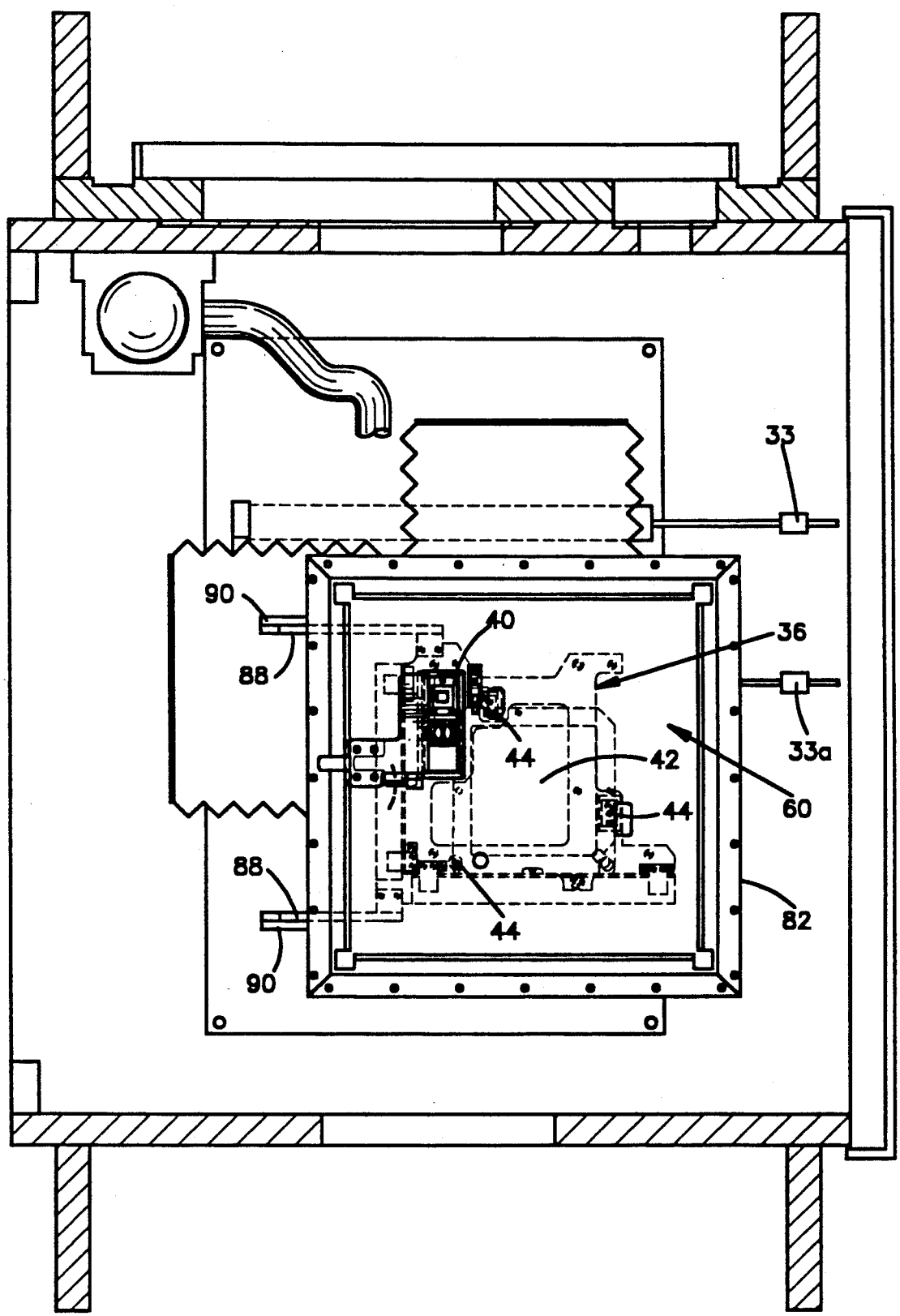
FIG. 2 is a top view of a component of the electron-beam drilling apparatus, namely a stage pedestal.
Figure 2A:
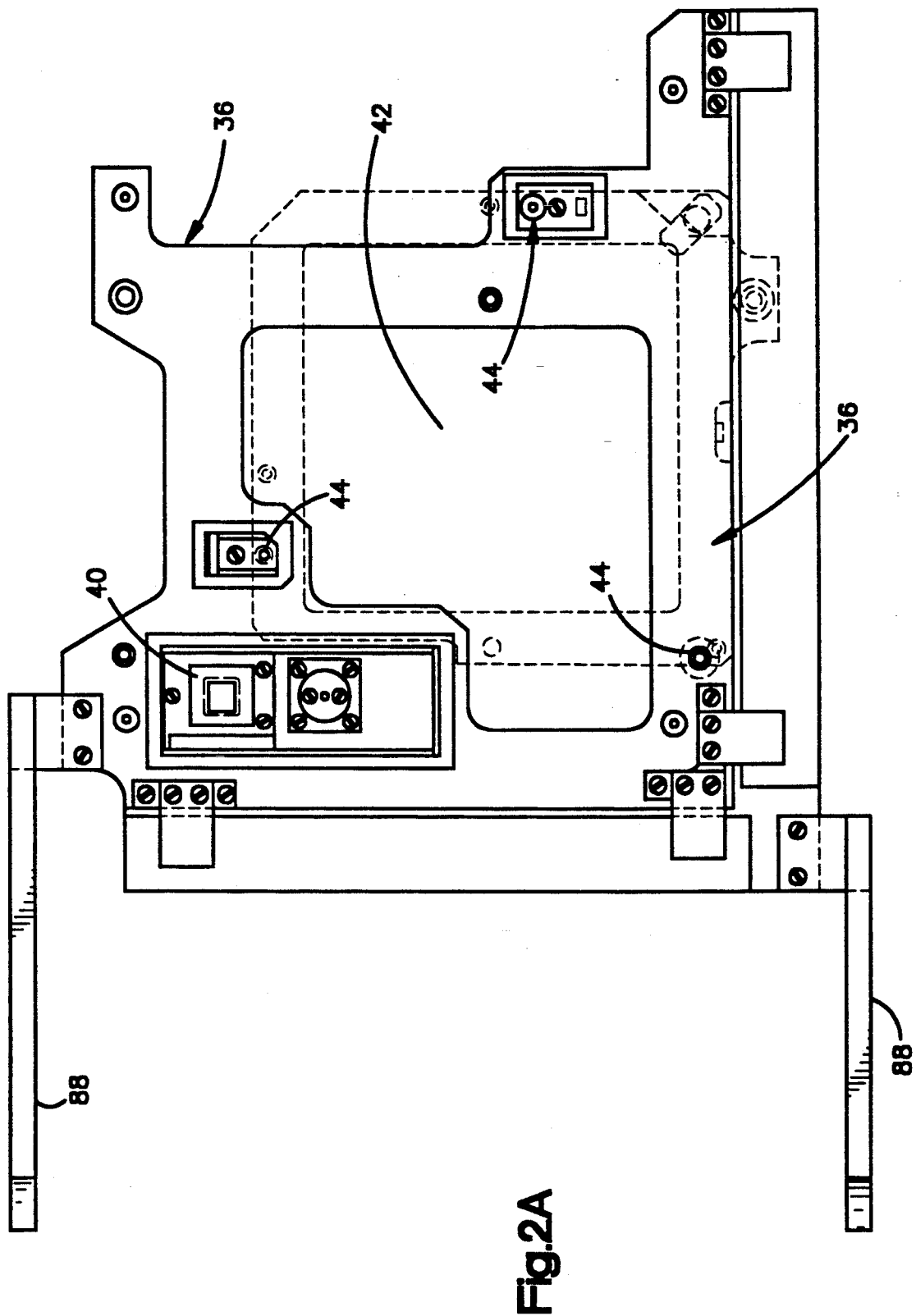
FIG. 2A is a top plan view of a portion of FIG. 2 on an enlarged scale therefrom.
Figure 3:
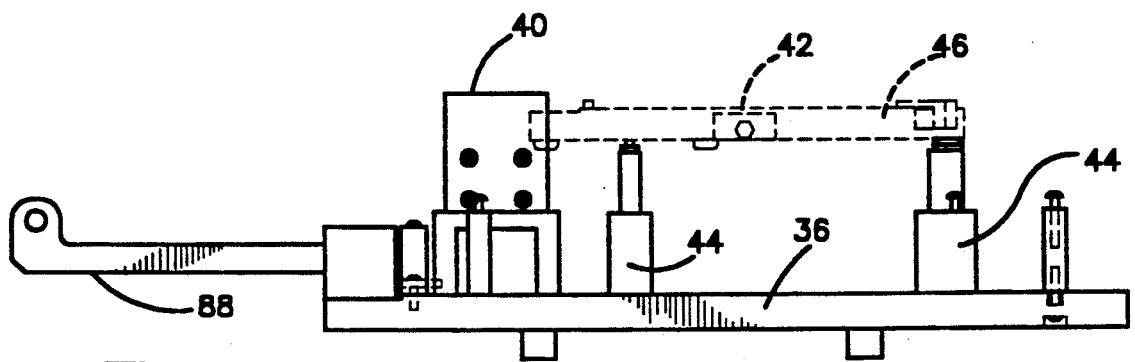
FIG. 3 is a side view of the stage pedestal.

Referring now to the drawings in detail and initially to FIG. 1, a debris control system 20 according to the present invention is illustrated. The debris control system 20 is shown incorporated into an electron-beam drilling apparatus 22 protecting it from damage due to dust generated during drilling. As is explained in more detail below, the debris control system 20 is designed to protect the debris-sensitive components of the electron-beam drilling apparatus 22. In this manner, production of the apparatus is increased by reducing the duration and frequency of maintenance and reducing the exposure of the sensitive parts to the debris.

The electron-beam drilling apparatus 22 is conventional in nature and thus need only be briefly described for the purposes of the present invention. Specifically, the apparatus 22 includes a chamber 30 which houses the other components of the apparatus and the debris control system 20. A suitable vacuum pressure is maintained in the chamber 30 in an appropriate manner, such as by a vacuum pump (not specifically shown or numbered).

The electron-beam drilling apparatus 22 additionally includes an X-Y stage 32 and a beam column 34. The X-Y stage 32 is mounted within the chamber 30 in such a manner that selective two-dimensional movement is possible. This is accomplished in a conventional manner using a pair of DC drive motors and gears 33 and 33a. The DC drive motors and gears 33 and 33a engage sections of the stage 35, 35a which are mounted on rails (unnumbered) for movement in direction normal to each other. Hence, full X-Y directional movement is permitted. The stage 32 supports a pedestal 36 including a beam-calibration area 40 and a work-piece area 42. (See FIGS. 1, 2, 2A, and 3.) The beam-calibration area includes sensitive components, such as precision pin holes and faraday cups, which communicate with optical equipment including mirror and interferometer optics also contained within the chamber, which are used in the calibration of the electron beam and positioning of the table for drilling. The work-piece area 42 includes three perpendicularly projecting locating pads 44 which are designed to support a carrier 46 which in turn mounts the work piece to be drilled.

The beam column 34 constitutes an opening in the chamber 30 through which an electron-beam is projected and focused in a conventional way. In the initial stages of a drilling process, the X-Y stage 32 will be moved into a calibration position whereat the pedestal's calibration area 40 is aligned with the beam column 34 thereby allowing calibration procedures to be performed. The X-Y stage 32 is then moved into a drilling position whereat the pedestal's work-piece area 42 is aligned with the beam column 34 thereby allowing drilling procedures to be performed. The X-Y stage 32 will subsequently move into a variety of drilling positions, each of which in the work-piece area 42 is aligned with the beam column 34.

As was indicated above, the components of the electron-beam drilling apparatus 22 are essentially conventional. However, one feature incorporated in the present invention is the use of only three locating pads 44 in a triangular arrangement. By using three locating pads 44, as opposed to four or more, a planar mounting of the carrier 46 is guaranteed. An additional feature believed to be unique to the present invention is a support box 49 mounted adjacent the beam column 34. As is explained in more detail below, the support box 49 coordinates with the debris control system 20.

Figure 5:
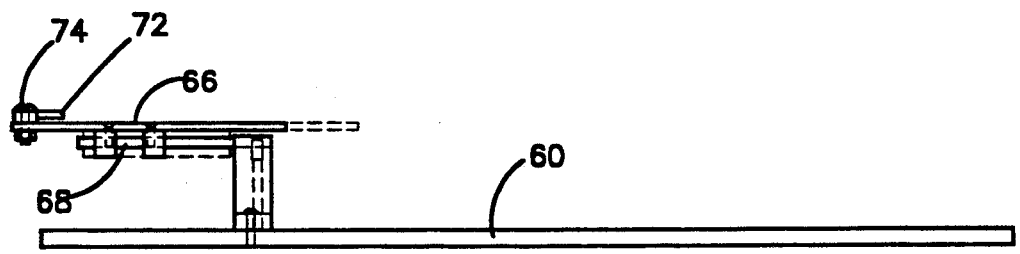
FIG. 5 is a side view of certain portions of the calibration shielding assembly.
Figure 4:
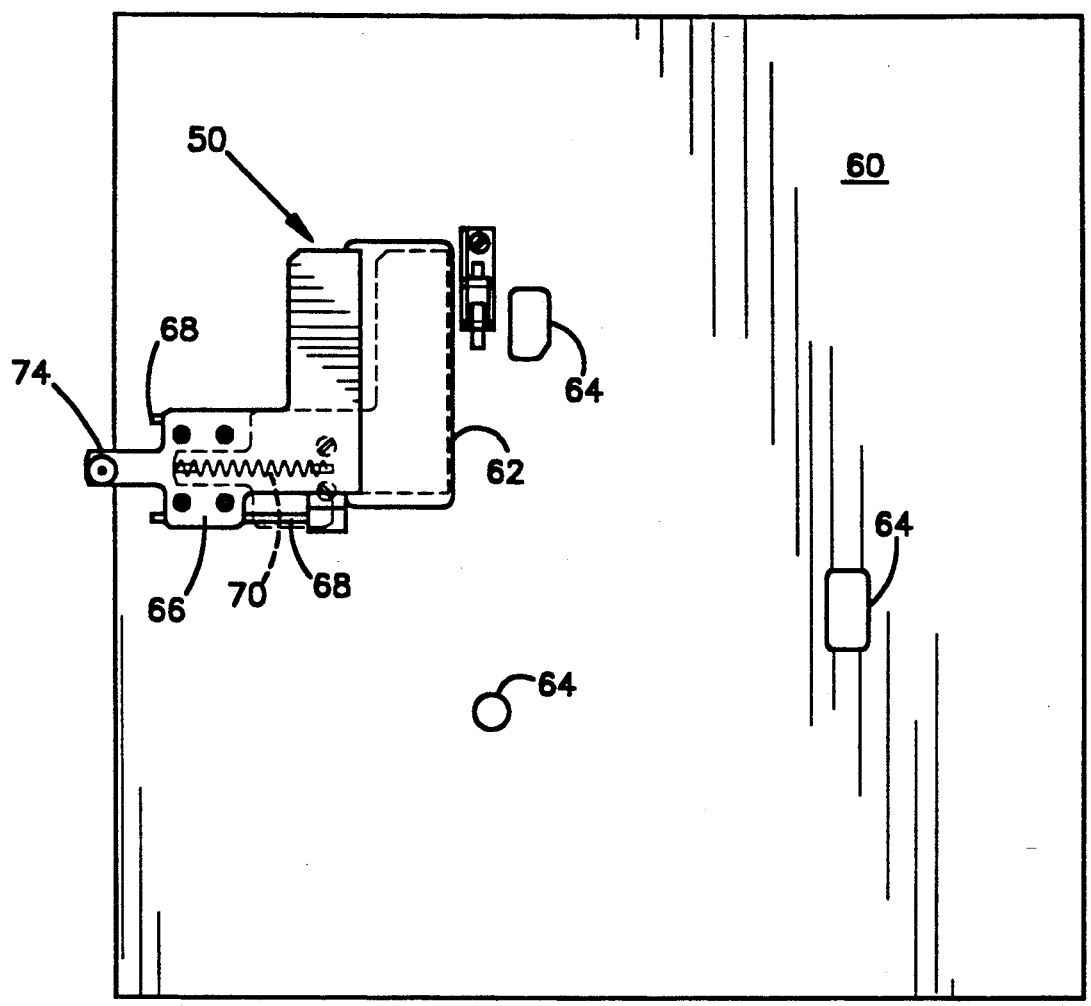
FIG. 4 is atop view of certain portions of an assembly constituting part of the debris control system, namely a calibration-area shielding assembly.

Turning now to the debris control system 20, it comprises a calibration-area shielding assembly 50 and an isolating assembly 52. Addressing initially the calibration-area shielding assembly 50, it includes a support plate 60 which is coupled to the stage pedestal 36. (See FIGS. 4 and 5.) The support plate 60 includes a calibration opening 62 and locating pad openings 64. When the support plate 60 is properly coupled to the stage pedestal 36, the calibration opening 62 is vertically aligned with the calibration area 40 of the pedestal 36 and the locating pads 44 project through the locating pad openings 64. In this manner, the carrier 46 will be supported above the support plate 60, in alignment with the pedestal's work-piece area 42.

The calibration-area shielding assembly 50 additionally includes a debris shutter or cover 66 mounted to the support plate 60 adjacent the calibration opening 62. Specifically, the debris shutter 66 is slidingly mounted on rails 68 for horizontal movement between an open position (shown in FIGS. 1, 4 and 5), whereat the calibration opening 62 is uncovered, and a closed position whereat the calibration opening 62 is covered. A spring 70 biases the debris shutter 66 into the closed position.

The calibration-area shielding assembly 50 further includes a reaction bar member or can 72 which extends downwardly from the support box 49 and a reaction-cam follower 74 which extends upwardly from the debris shutter 66. When the X-Y stage 32 is in a drilling position, the reaction-bar 72 is remotely located relative to the reaction-cam 74 and thus the debris shutter 66 is spring biased in the closed position. In this manner, the calibration area will be shielded from drilling-generated debris. However, when the X-Y stage 32 is moved into the calibration position, the reaction-bar 72 contacts the reaction cam 74 and moves the debris shutter to the open position. In this manner, the calibration area is shielded from debris, while at the same time is accessible for calibration purposes.

Addressing the isolation assembly 52, it includes a flexible bellow curtain 80 and a frame 82. The bellow curtain 80 forms an isolation chamber 84 extending from the support plate 60 to the beam column 34. Specifically, the upper edge of the bellow curtain 80 is attached to the support box 49 and the bottom edge of the bellow curtain 80 is attached to the frame 82. The frame 82 normally rests on the support plate 60 and generally surrounds both the beam-calibration area 40 and the work-piece area 42. In this manner the bellow curtain 80 together with the support plate 60 and support box 49 form an enclosure that will prevent the debris from entering the rest of the chamber 30 during drilling.

Figure 6:
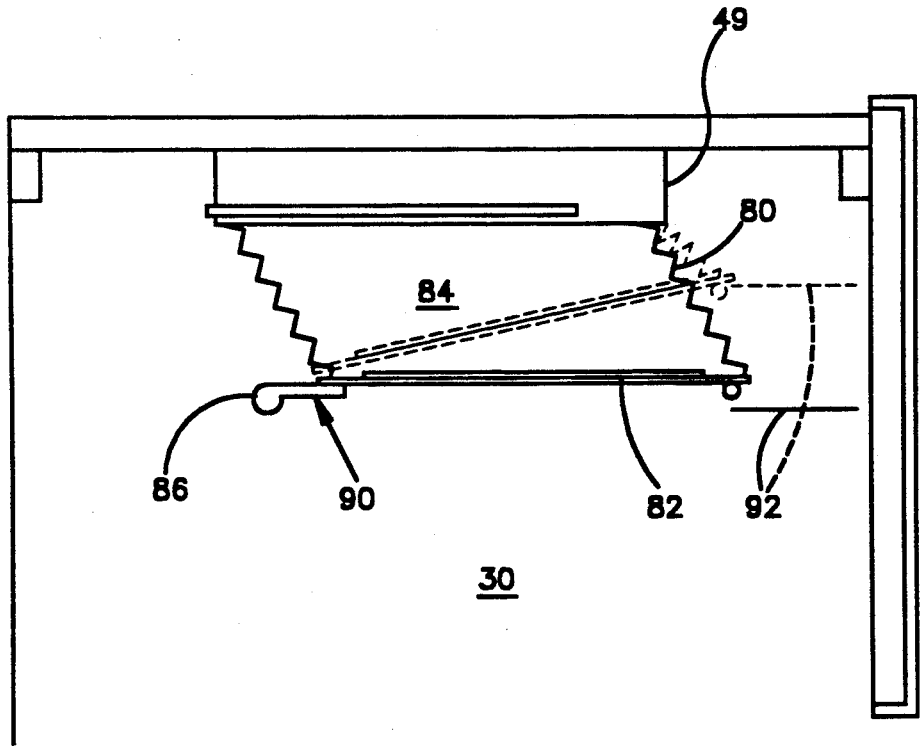
FIG. 6 is a schematic view of certain portion of another assembly constituting part of the debris control system, namely a drilling-area isolating assembly.

The isolation assembly 52 additionally includes a pivoting device 84 which pivotally couples the frame 82 to the stage pedestal 36. Specifically, the pivoting system 84 includes a pair of legs 88 extending from the stage pedestal 36 (See FIGS. 2 and 3), a pair of legs 90 extending from the frame 82, and a pair of hinges 86 therebetween. An opening/closing member 92 is provided which is mounted on chamber door 93. The door 93 is movable upwardly from the closed position shown in FIG. 1 to an open position shown in FIG. 6. The opening/closing member 92 engages the frame 82 when the door is opened to lift the edge of frame 82 off of the support plate 60 and pivot the frame about the hinges 86. (See FIG. 6.) In this manner, the frame 82, and the bellow curtain 80 attached thereto, may be selectively moved between an open position to allow the introduction and removal of a work piece, and a closed position to act as a debris shield during drilling operations. The bellow curtain 80 is of a sufficient flexibility to allow this movement of the frame 82 and also to allow for manipulation of the stage pedestal 36 during the drilling process and to the calibration position. Indeed, the bellow curtain is similar in construction to the bellows on a bellow-type camera.

In the open position, the drilling-chamber communicates with the remainder of the chamber 30 and the carrier 46 may be loaded onto or removed from the loading pads 44. In drilling the greensheets of ceramic the electron-beam vaporizes any solvent and organic binder thus destroying the cohesiveness of the ceramic particles thereby creating a debris of abrasive dust when drilling the holes. In the closed position, the drilling chamber is isolated from the remainder of the chamber 30 and drilling procedures may be performed in this closed environment. In this manner, the sensitive components such as the vacuum pump and bearing of the electron-beam drilling apparatus 22 will be isolated from drilling-generated debris during the drilling process. Moreover, although the beam calibration area is within isolation assembly 52, the sensitive instrumentation is protected by the calibration area shielding assembly 50 during drilling.

The isolation assembly 52 further includes a filter 98 which communicates with the drilling-chamber 30. During drilling there is a slight rise in pressure due to the generation of gases from the solvent and organic binder. The filter 98 accomplishes two functions. First, it traps particles and vapors given off during the drilling process while still maintaining the drilling area at the necessary vacuum pressure. Second, the filter 98 allows enough flow so that the bellow curtain 80 may remain closed during pumping and venting of the chamber 30 such that debris from the drilling area will not be blown into the sensitive components of the drilling apparatus 22 but rather pass through the filter 98 which preferably is a high vacuum compatible filter with sufficient through-put to prevent large pressure differential such as that manufactured by Baldur Corp. (Without the filter 98, the bellow curtain 80 might be damaged due to the pressure differential between the drilling area and the remainder of the chamber 30 during pumping and venting.)

One may now appreciate that the debris control system 20 contains drilling-generated debris within an easily cleanable area and away from sensitive components of the apparatus 22 with the beam calibration assembly protected from debris. Thus, production by the apparatus is increased by reducing the duration and frequency of maintenance which in the past has been required to clear the debris; such maintenance often being required several times in a single eight hour shift. Additionally, the system is made economically feasible by protecting expensive parts from damage. Still further, the chamber of the apparatus may be pumped and vented as required without blowing debris on sensitive components.

While the invention has been described in conjunction with electron beam drilling of ceramic greensheets, it can also be utilized for other types of drilling, e.g. laser drilling, and for the drilling of other types of materials, e.g. polyimides and other polymers and composite materials.

Although the invention has been shown and described with respect to a certain preferred embodiment, it is obvious that equivalent alterations and modifications will occur to others skilled in the art upon the reading and understanding of this specification. The present invention includes all such equivalent alterations and modifications and is limited only by the scope of the following claims.

What is claimed is:

1. A debris control system for a beam drilling apparatus, said system comprising:
    a calibration-area shielding assembly which shields a calibration area on a movable support member of such apparatus from drilling-generated debris and wherein said calibration area includes a calibration device alignable with the beam of the apparatus;
    said calibration-area shielding assembly comprising a movable cover, and a reaction member;
    said cover being coupled to said shielding assembly in such a manner that is movable between an open position in which said calibration device is uncovered and a closed position in which said calibration device is covered;
    said cover being normally biased into said closed position;
    said reaction member causing said cover to move to said open position when such calibration area is in a given orientation with respect to the beam.

2. A debris control system as set forth in claim 1 wherein said debris cover is biased into said closed position by a spring.

3. A debris control system as set forth in claim 2 wherein said reaction member includes a reaction bar which is coupled to such drilling apparatus and a reaction cam which is coupled to said debris cover and which reacts with said reaction bar.

4. A debris control system as set forth in claim 3 wherein said debris cover is coupled to said support member by slidingly mounting said cover on rails for horizontal movement.

5. The debris control system as set forth in claim 1 wherein the beam is an electron-beam, and the assembly includes a vacuum chamber in which the drilling is performed.

6. The debris control system as set forth in claim 5 wherein the support member has at least one support device to support a work piece carrier.

7. The debris control system as set forth in claim 6 wherein there are three support devices arranged to support said work piece carrier.

8. A debris control system for a beam drilling apparatus having a main chamber including a support plate having a drilling area, said system comprising:
    an isolation assembly to isolate drilling-generated debris within the region surrounding said drilling area;
    said isolation assembly including a selectively movable curtain member, and a curtain opening/closing member,
    said opening/closing member selectively moving said curtain member between an open position and a closed position;

said curtain member defining an isolation enclosure when in said closed position which surrounds said drilling area; and, configured in said open position to allow access to said support plate for placement and removal of a work piece in said drilling area.

9. A debris control system as set forth in claim 8 wherein said curtain member has a bellows configuration.

10. A debris control system as set forth in claim 9 further characterized by a frame member attached to one end of said bellows curtain and configured to rest upon said support plate in the closed position.

11. The debris control system as set forth in claim 10 wherein said support plate is mounted for pivotal movement between said closed and said open positions.

12. A debris control system as set forth in claim 8 wherein further characterized by a filter interconnecting said enclosure and said main chamber.

13. A debris control system for a beam drilling apparatus having a moveable support plate having an isolation chamber encompassing a drilling area and a calibration area, and wherein said calibration area includes a calibration device alignable with the beam of the apparatus, said system comprising:

a calibration-area shielding assembly which shields said calibration area of such apparatus from drilling-generated debris and an isolation assembly which isolates drilling-generated debris within such drilling area;

said calibration-area shielding assembly comprising a moveable cover, and a reaction member;

said cover being coupled to said support plate in such a manner that it is movable between an open position in which said calibration device is uncovered and a closed position in which said calibration device is covered;

said cover being normally biased into said closed position;

said reaction member being positioned to cause said debris cover to move to said open position when such calibration area is in a certain orientation with respect to said beam;

said isolation assembly including a bellow curtain and a bellow opening/closing member;

said opening/closing member being arranged to selectively move said bellow curtain between an open position and a closed position;

said bellow curtain defining an enclosure when in said closed position which surrounds said drilling area and an open position to allow placement and removal of a work piece on said support plate in said drilling area.

14. A debris control system for a beam drilling apparatus, said system comprising:

a calibration-area shielding assembly which shields a calibration area no a movable support member of such apparatus from drilling-generated debris and wherein said calibration area includes a calibration device alignable with the beam of the apparatus;

said calibration-area shielding assembly comprising a movable cover which is coupled to said shielding assembly in such a manner that it is movable between an open position in which said calibration device is uncovered and a closed position in which said calibration device is covered;

said cover being normally biased into said closed position;

said calibration-area shielding assembly further comprising means for causing said cover to move to said open position when such calibration area is in a given orientation with respect to the beam.

* * * * *